March 26, 1957 A. W. KEEN ET AL 2,786,237
METHOD OF CASTING RUBBER SOLES ON SHOES
Original Filed Oct. 25, 1950 4 Sheets-Sheet 1
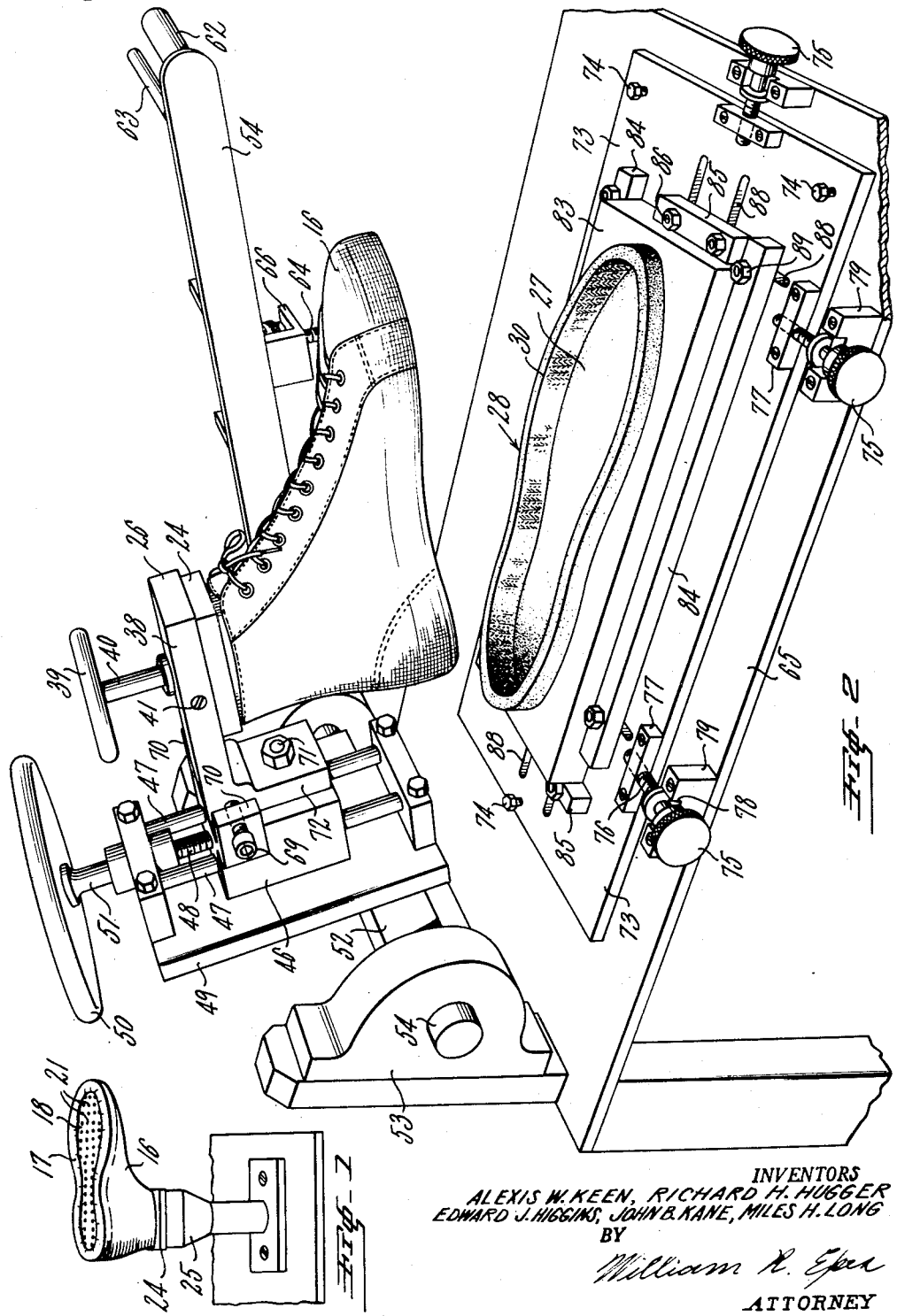
INVENTORS
ALEXIS W. KEEN, RICHARD H. HUGGER
EDWARD J. HIGGINS, JOHN B. KANE, MILES H. LONG
BY
William R. Eper
ATTORNEY March 26, 1957 A. W. KEEN ET AL 2,786,237
METHOD OF CASTING RUBBER SOLES ON SHOES
Original Filed Oct. 25, 1950 4 Sheets-Sheet 2
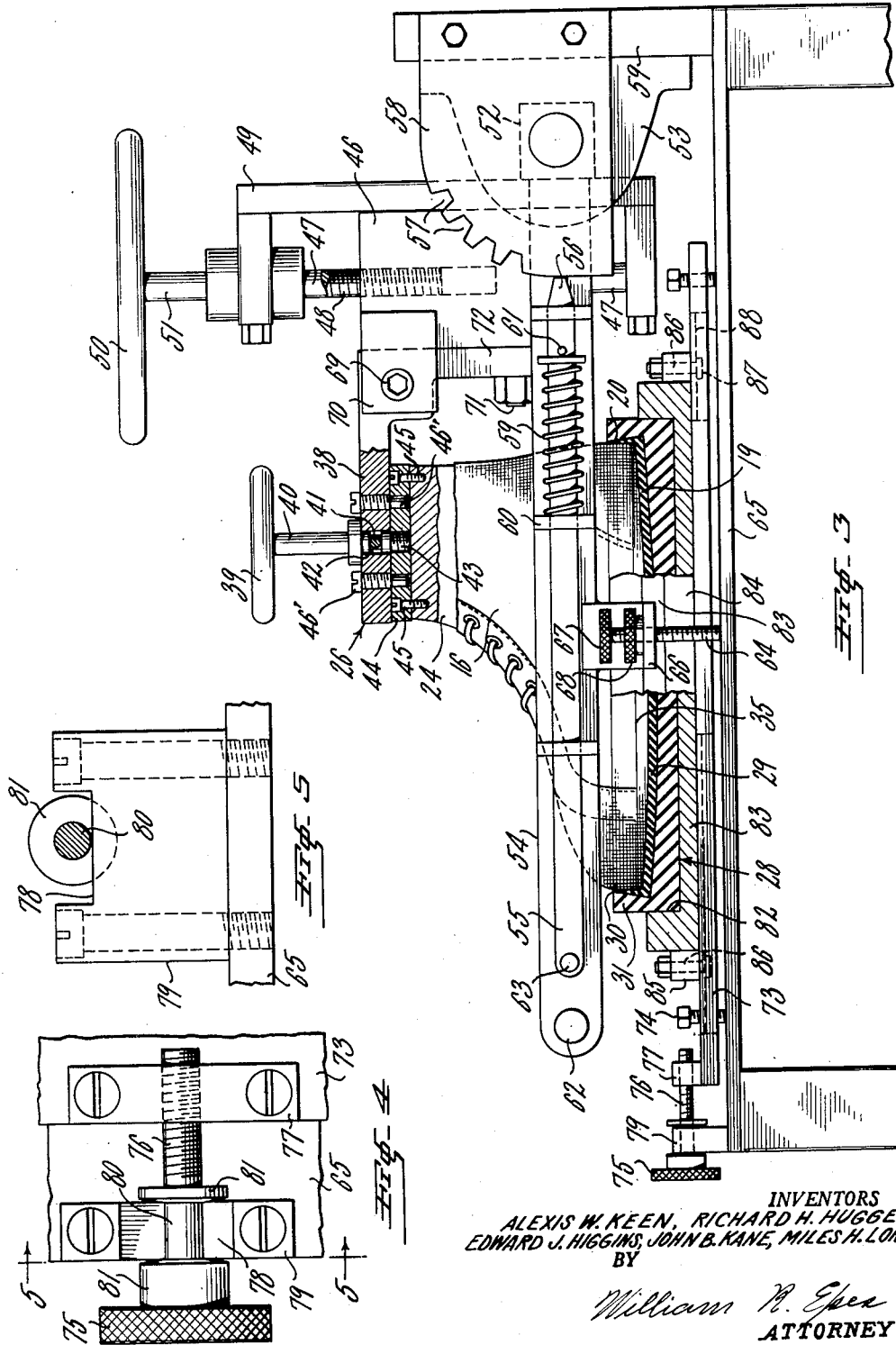
INVENTORS
ALEXIS W. KEEN, RICHARD H. HUGGER
EDWARD J. HIGGINS, JOHN B. KANE, MILES H. LONG
BY
William R. Egan
ATTORNEY

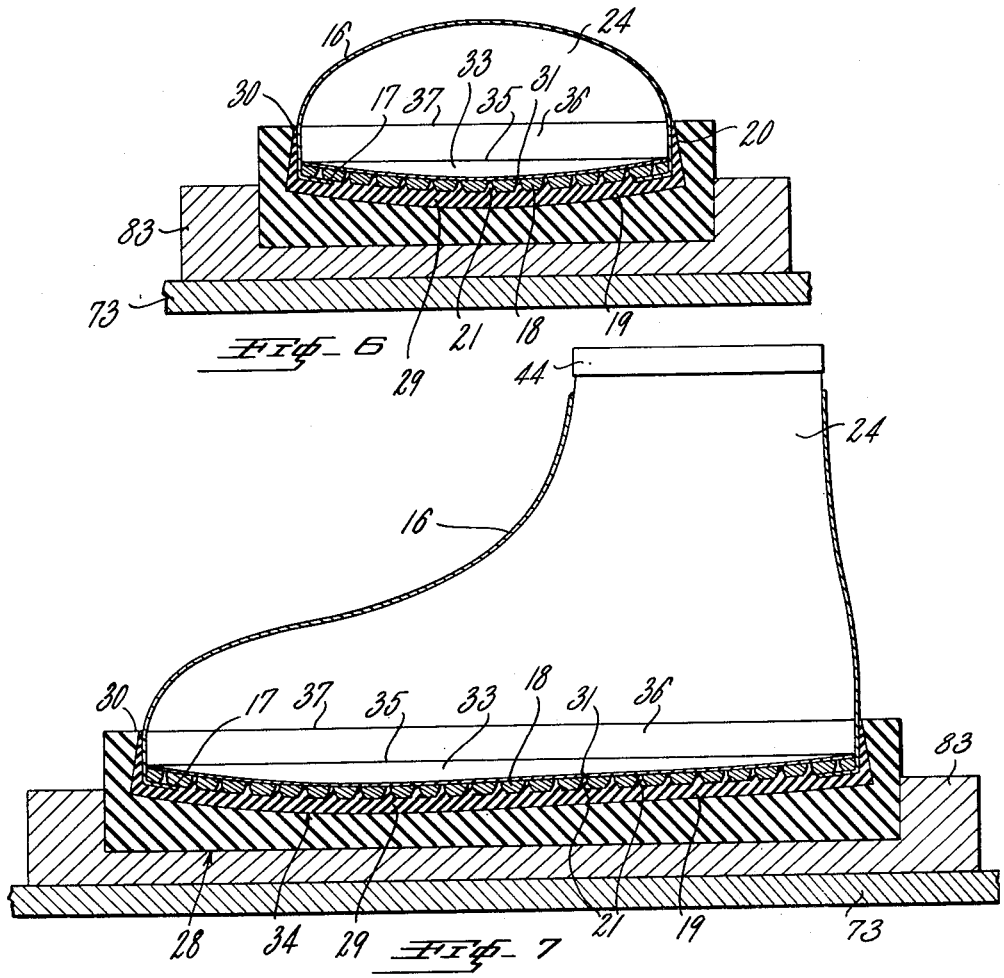
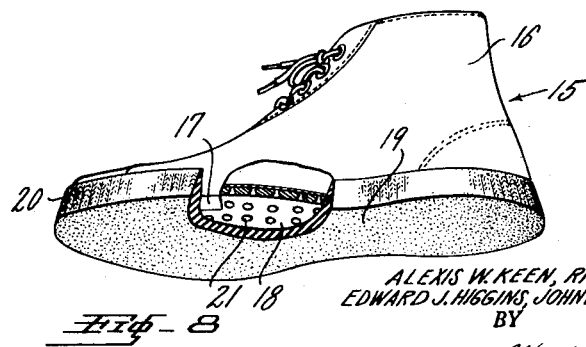

March 26, 1957 A. W. KEEN ET AL 2,786,237
METHOD OF CASTING RUBBER SOLES ON SHOES
Original Filed Oct. 25, 1950 4 Sheets-Sheet 4
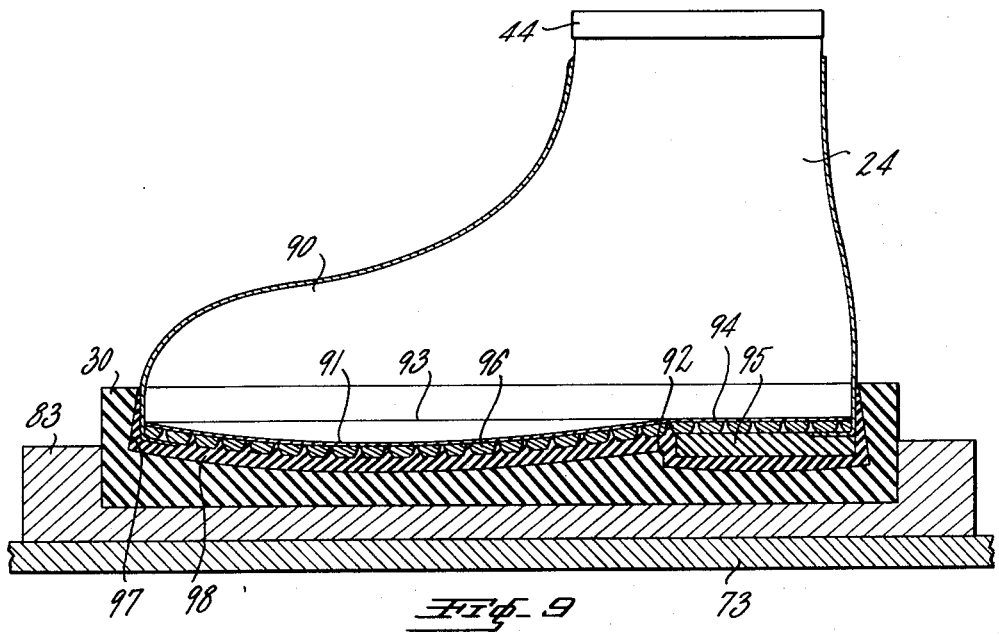
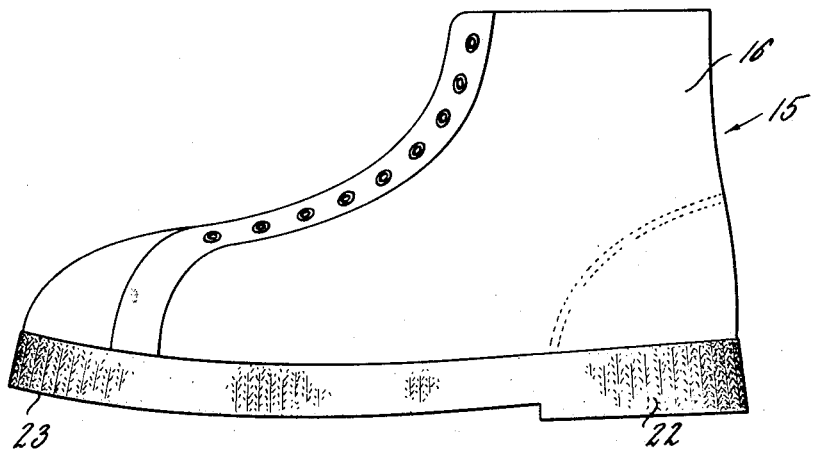
INVENTORS
ALEXIS W. KEEN, RICHARD H. HUGGER
EDWARD J. HIGGINS, JOHN B. KANE, MILES H. LONG
BY
ATTORNEY United States Patent Office 2,786,237
Patented Mar. 26, 1957

2,786,237

METHOD OF CASTING RUBBER SOLES ON SHOES

Alexis W. Keen, Packanack Lake, and Richard H. Hugger, Ridgewood, N. J., Edward J. Higgins, Scarsdale, N. Y., John Byrne Kane, Stamford, Conn., and Miles H. Long, Montoursville, Pa., assignors to United States Rubber Company, New York, N. Y., a corporation of New Jersey Continuation of application Serial No. 192,086, October 25, 1950. This application June 12, 1953, Serial No. 361,392

7 Claims. (Cl. 18—59)

This invention relates to an improved shoe, and the improved method and apparatus for casting a rubber composition outsole, with or without a foxing, directly onto the shoe from gelable latex composition contained in an open mold cavity, and into which the bottom of the shoe forming the outsole foundation is suspended from above in the open mold cavity.

Heretofore, rubber composition soles have been formed on the bottom of lasted shoe uppers by molding processes, in which the upper was sealed against the rigid rim of a metal mold by forcing the bottom of the upper in contact with the rim. In such processes a closed mold was used to mold the charge of rubber composition into a properly shaped shoe sole. Air was trapped in the closed system and unless it was discharged prior to the vulcanization of the sole, which was carried out in the mold, the air caused voids or blisters to be formed in the vulcanized sole. The air was eliminated in some cases by molding the charge under pressure. Due to variations in the bottom sealing surface of lasted shoe uppers, it was difficult to produce a good seal between the upper and the mold rim, and when the pressure on the mold charge was increased, the difficulty of producing a seal was also increased. In order to seal the mold cavity under high pressure, the shoe upper was sometimes cut as a result of its pressure against the mold rim.

The foregoing and other disadvantages of the processes are eliminated or reduced in accordance with the practice of the present invention by utilizing an open mold cavity containing a freely flowable charge of gelable latex and suspending the bottom of the shoe, or the outsole foundation in the liquid charge without closing the mold cavity. The liquid latex is poured into the open mold cavity having its side walls, which form the outer edge of the outsole, extending upwardly. The outsole foundation is lowered into latex to the required depth. The displaced latex is forced upwardly, and the displaced air is free to flow through the open rim of the mold cavity.

The latex gels very quickly and is thereby cast onto the outsole foundation of the shoe upper to form the outsole. A foxing integral with the outsole may be formed on the upper depending upon the distance the upper is lowered into the mold cavity. After the latex has gelled, the shoe is removed from the mold and the outsole is dried and vulcanized, which may occur simultaneously.

Other important characteristics of this invention are the novel last and mold, and the apparatus for manipulating the last and mold in carrying out the process for the manufacture of the improved rubber soled shoe which is free from mold markings or cuts and is also light and durable, and less costly.

The invention is further described in reference to the accompanying drawings,

Fig. 1 illustrates the conventional method of lasting a shoe upper over an insole to which an outsole is applied in accordance with this invention;

Fig. 2 is a perspective view of the novel apparatus for casting a rubber composition sole onto the conventionally lasted shoe upper, which is being held above the casting position;

Fig. 3 is a side elevation of the apparatus illustrated in Fig. 2, but showing some of the parts in cross-section and with the shoe upper lowered into the gelable latex which is being cast onto the bottom of the upper, or outsole foundation;

Fig. 4 is a top plan view of a detail of the mechanism for adjusting the mold support in a horizontal plane;

Fig. 5 is an elevational view, partly in section, of the adjusting mechanism shown in Fig. 4, taken on line 5—5, and looking in the direction of the arrows;

Fig. 6 is a transverse cross-section through the toe portion of the shoe and the mold in the casting position shown in Fig. 3, and in which the last is shown in full front elevation;

Fig. 7 is a vertical longitudinal cross-section of the elements shown in Fig. 6, excepting the last is shown in side elevation;

Fig. 8 is a perspective view, partly in section, of the improved shoe made in accordance with this invention and by the use of the apparatus illustrated in the foregoing figures of the drawings;

Fig. 9 is a longitudinal cross-section of a shoe and mold for making a modified form of outsole, which is provided with a raised heel; and Fig. 10 is a side elevational view of the shoe made by means of the last and mold shown in Fig. 9.

Shoes manufactured in accordance with this invention are illustrated in Figs. 8 and 10, and the remaining figures of the drawings illustrate the method and apparatus used in the manufacture of the shoes. Referring to Fig. 8, the shoe 15 has the appearance of a conventional tennis shoe. It comprises a canvas upper 16 having its bottom edge 17 lasted in a conventional manner over insole 18, to which the lower edge 17 is adhered. The bottom of the upper 16 and the insole 18 form an outsole foundation onto which the outsole 19 is cast directly from a gelable latex. The outsole foundation may also be constructed with a platform portion secured to the lower surface of the insole and the bottom of the upper. In this construction the outsole is cast directly around the bottom of the upper and the platform.

As illustrated herein the shoe is provided with a foxing 20, which is cast integrally with the outsole 19. The foxing is provided to protect the bottom of the upper 16 from wear, and to strengthen the union between the sole and the upper, however, the foxing 20 may be omitted if desired. In any event a very good bond is formed between the cast outsole 19 and the outsole foundation by the penetration of the liquid latex into the interstices of the outsole foundation prior to the gelling of the latex. The outsole foundation is made sufficiently rigid to resist the shrinkage of the deposited latex after being dried. For that purpose the insole 18 is relatively stiff, and it is also provided with perforations 21 into which the latex flows and strengthens the bond between the outsole 19 and the shoe sole foundation. The perforations 21 also operate to prevent blisters, or air pockets from forming bewteen the outsole and the insole. In order to take advantage of changes due to the shrinkage of the outsole 19 and foxing 20, they are cast into a slightly different shape from the final desired shape of the shoe after vulcanization. The shrinkage of the outsole and foxing draws these members into the desired conventional shape.

The outsole as cast is provided with a transversely convex tread surface to take advantage of changes in the exterior contour of the shoe due to shrinkage of the outsole. As the shrinkage takes place the convex surface becomes flatter without any substantial change in the vertically projected area of the sole. In the casting operation the unconfined surface of liquid latex comes to a level around the lower part of the upper and forms a straight foxing line. The foxing being thinner than the outsole, its change in shape due to shrinkage is minimized by the stiffness of the upper material. However, the foxing shrinks to some extent and draws the toe portion of the shoe upwardly. The longitudinal curvature of the shoe sole tread, as cast, may be so designed that the downward shrinkage pull of the tread surface and the upward shrinkage pull of the foxing result in providing the shoe sole, and the foxing to some extent, with an upward curvature at the toe which gives the shoe toe spring.

The outsole 19 may be cast with a substantially flat bottom as shown in Fig. 8, or it may be provided with a raised heel 22 as illustrated in Fig. 10. In either case the cast outsole may be provided with an upwardly curved toe portion 23, which provides the usual toe spring to the shoe.

The method of casting the sole 19 onto the bottom of the upper 16 is described in reference to the apparatus shown in Figs. 1 to 7. Referring to Fig. 1, the upper 16 may be lasted in a conventional manner, in which the insole 18 is placed upon the bottom of a last 24, and an assembled upper 16 is slipped over the last. Its bottom edge 17 is turned over and cemented to the bottom of the insole 18. The last 24 with the upper thereon is then removed from the stand 25 and affixed to a jig 26 for manipulating the last so that it may be moved accurately downwardly into, and upwardly out of a mold cavity 27 of a mold 28. For most efficient operation of the process, the walls of the mold cavity are coated with a liquid, hereinafter referred to as a lubricant, and liquid gelable latex 29 is then poured into the mold cavity. The lubricant prevents the latex from sticking to the cavity, and acts as a wetting agent for the latex. A suitable mold lubricant for this purpose is the sodium salt of di-octyl ester of sulfo succinic acid, preferably mixed with gasoline in the proportion respectively of 100 to 315 parts by weight. Such lubricant also inhibits synaeresis of the latex, which sometimes causes the fabric upper to be stained. One application of this lubricant is sufficient for four casting operations.

The lasted shoe upper 16 is lowered into the latex 29 and suspended therein in spaced relation to the walls of the mold cavity, as shown in Fig. 3, to form a space between the lasted upper and the walls of the cavity for the gelable latex. Upon gelling, the latex is cast onto the bottom of the lasted upper which forms the outsole foundation. The volume of latex poured into the open mold cavity 27 is selected to produce an outsole of the desired thickness, and a foxing of the desired height when the bottom of the upper has been lowered to a certain level in the mold cavity 27 and preferably when the latex is forced to the level of the upper rim 30 of the cavity, such rim preferably being located in a horizontal plane. As the bottom of the upper is lowered into the latex 29, it is displaced around the bottom of the upper, and the air in the cavity is free to flow outwardly through the space between the rim 30 of the mold and the upper. The air that may be trapped between the surface of the latex and the bottom of the upper is permitted to pass out through the perforations 21 of the insole 18. Such perforations are conical in shape. Their apexes 31 point upwardly, and form small openings through the top surface of the insole. The larger bases of the perforations 21 at the bottom surface of the insole 18 permits the entry of the liquid latex. The smaller openings at the top surface of the insole excludes the latex but permits the discharge of the trapped air.

The latex 29 is compounded with curing agents prior to adding the gelling agent, which latter is done immediately prior to pouring the latex into the mold cavity. A sufficient quantity of the gelling agent is added to cause the latex to gel quickly at a room temperature of about 70° F. After it has gelled, the lasted upper 16 with the gelled latex outsole 19 and foxing 20 adhered thereto are raised upwardly out of the mold cavity 27. Where the sidewalls 31 of the mold 28 overhang the mold cavity, they are made of flexible elastic material, so that they may be spread outwardly by the gelled latex without injury to the foxing and outsole. The overhanging portions of the sidewalls 31 may result from their inward inclination to the top rim 30, or from indentations formed therein to produce decorative surfaces on the sides of the outsole and foxing.

The last 24 is removed from the jig 26 and, together with the lasted upper 16 and cast latex sole 19 thereon, it is passed through a vulcanizer, where the cast latex sole and foxing are simultaneously dried and vulcanized, preferably at a temperature of about 270° F. for 80 minutes. After the vulcanizing operation, the shoe 15 is removed from the last 24. Any tension stresses set up in the cast outsole during drying and vulcanization are prevented from distorting the shape of the shoe by the stiff outsole foundation. What little change in the exterior contour of the shoe does take place is compensated for by the design of the outsole, i. e., the outsole is cast with a convex bottom surface which merely becomes flatter as any adjustment in shape takes place.

This invention is not limited to a definite compound of gelable latex, and may be varied for special conditions and results desired. As a specific example, the compound may be composed of components A, B, C, and D, in which all parts are by weight, and where:

A is a 68% ammonia preserved concentrated natural rubber latex deammoniated with formaldehyde, and restabilized by the addition of 0.1 part ammonia and .045 part potassium hydroxide per 100 parts dry weight of rubber latex.

B is a conventional curing paste containing:

1.0 part sulphur
5. parts zinc oxide
2.5 parts ultra accelerators [composed of 1.2 parts zinc salt of 2-mercaptobenzothiazole and 1.3 parts zinc diethyldithiocarbamate]
0.5 part antioxidant
0.2 part dispersing agent containing 6.1 parts water.

C is water.

D is a gelling agent per U. S. Patent 2,343,545, and containing:

1.0 part sodium silicofluoride
0.02 part sodium fluoride
0.02 part coloidal clay (bentonite) in 0.96 parts of water ball-milled together for 24 hours
6.5 parts water added to the mixture of the preceding ingredients.

To produce the gelable latex the above components are mixed as follows:

147 parts of A is mixed with 15.3 parts of B and then 39.7 parts of C are stirred into the mixture of A and B. The mixture of A, B and C is allowed to stand from 36 to 48 hours to deaerate and partially vulcanize the latex before adding the component D (the gelling agent). The partial vulcanization is carried to the extent of chemically combining 0.05 part of the sulphur in the latex compound. The mixture of A, B and C is mixed with the component D in the proportion of 150 grams of the mixture A, B and C to 5.8 cc. of component D.

The setting or gelling of the latex may be accomplished by the use of gelling agents other than sodium silicofluoride. For example, potassium silicofluoride, polyvinyl methyl ether and an acid, ammonium nitrate, etc., may be used. However, a temperature of 95° F. or higher is required to set or gel the latex, where potassium silicofluoride is used.

The period of time required for the latex to gel or set may be decreased by increasing the proportion of the gelling agent or by increasing the temperature of the latex for any selected gelling agent. It is also contemplated that the setting time of the latex may be decreased for a given proportion of the gelling agent used in the latex by either heating the mold 28 or the lasted upper 16, or both to raise the temperature of the latex after it has been poured in the mold. It is preferable to heat the lasted upper either by heating the last 24 prior to lasting the upper 16 thereon, or by heating the last 24 after the lasting operation and immediately before lowering the upper into the latex, because the accelerated gelling action due to the supplied heat will not be effective until the lasted upper is placed in position in the mold cavity. By virtue of heating the lasted upper, the heating of the mold may be avoided, and the subsequent cooling of the mold prior to placing the gelable latex therein may also be avoided. The heating of the shoe upper has the further advantage of quickly gelling the latex so as to prevent the straining of a fabric shoe upper due to the capillary attraction of the fabric of the latex, which causes it to rise above the level of the sole or foxing.

It is also contemplated that the staining of the fabric by the travel of the latex above the level line may be prevented by thinly coating the bottom of the lasted upper 16 and the bottom edge of the upper to the height of the top of the foxing line with a latex cement, which is compounded with wetting agents and commonly used for adhering unvulcanized rubber parts to fabric. The cement is permitted to dry but not to be vulcanized prior to placing the bottom of the shoe upper in the mold cavity 27. If the last is heated to accelerate the setting period of the latex in the mold cavity and a latex cement is also used, the latex cement should have a vulcanizing temperature above that to which the upper is heated.

The application of heat to the gelable latex in the mold has the further advantage of permitting the gelling agent to be added to latex in bulk and held available for pouring into the mold as required. In such case it is necessary to hold the gelable latex at a temperature below the active temperature of the gelling agent.

The use of ultra accelerators in the latex compound has the advantage of reducing the composite time for drying and vulcanizing the rubber coagulum in the sole by permitting such processes to take place concurrently. Where accelerators, other than ultra accelerators, are used which are not effective at temperatures below 220° F., the sole of rubber coagulum must be substantially dried before the sole is vulcanized to avoid blistering. That practice requires a much longer time than when the processes are carried on concurrently. It has been found that with the use of ultra accelerators and radiant heat, the sole of rubber coagulum may be treated at temperatures higher than 220° F. to concurrently dry and vulcanize it. As a specific example, a rubber sole deposited from latex compounded in accordance with the preceding specific example was completely dried and vulcanized within 80 minutes in an oven through which air was circulated at 270° F. The thickness of the dried sole was 0.120 to 0.125 inches. A longer time would be required for thicker soles.

In order to provide for the change in shape of the outsole 19 due to shrinkage of the rubber, the last 24 as shown in Figs. 6 and 7 is provided with a decidedly convex bottom 33, that is, its bottom surface is curved both transversely, and longitudinally from heel to toe. The mold 28 is provided with a correspondingly shaped bottom surface 34. The border of the convex surface 33 of the last 24 lies in one plane 35. The border of the concavely curved bottom 34 of the mold 28 also lie in one plane, which is parallel to the plane 35 of the bottom border of the last 24. The insole 18 is preferably lasted to conform with the curvature of the last 24, as at 33, so that a uniform thickness of rubber will be deposited between the insole and the bottom 34 of the cavity 27 to form the outsole 19. The foregoing construction causes the bottom surface of the outsole 19 to be cast with convex curvature and uniform thickness. When the curved surface contracts after the shoe 15 is removed from the last, the convex surface decreases in area, and therefore flattens out. The convexity of the outsole surface is sufficient to insure that the shoe assumes a normal shape after shrinkage.

When the bottom surface of the outsole shrinks, its side edges contract and the sides of the foxing 20 have a tendency to lean away from the inside of the shoe. In order to allow for the change in the angle of the side edges of the sole and foxing, such side edges are initially formed at an inwardly inclined angle by undercutting the sides of the mold as shown in Fig. 3. It is desirable to taper the thickness of the foxing 20 upwardly from the outsole, and for that purpose the last 24 is provided with vertically extending sides 36, which project from the plane 35 of the border of the convex surface 33 to a plane 37 as high as the level of the rim 30 of the mold 28.

The jig 26 for manipulating the last 24 and the mold 28 is provided with an overhanging arm 38, to which the last is attached by means of a hand wheel 39. As shown in Fig. 3, the hand wheel 39 is affixed to a stem 40, which is rotatably mounted in the arm 38 and held against removal by a screw 41 which is threaded into the arm 38 and extends into a groove 42 in the stem 40 of the hand wheel 39. The stem 40 is provided with a threaded end 43, which screws into a threaded bore in a cap 44 which is attached to the last 24 by the screws 45. Pins 46' secured in the arm 38 extended into bores in the top plate 44 of the last and locate the last in a fixed position in reference to the arm 38.

The arm 38 is carried by a vertically moveable slide 46, which is slidably mounted on guide rods 47. The slide 46 is actuated by a screw 48 mounted on a block 49 and operated by hand wheel 50 mounted on the stem 51 of the screw. The block 49 is affixed to a shaft 52, and the previously described system which is carried thereby is pivoted in a fixed journal 53 into which the round ends 54 of the shaft 52 are mounted.

As shown in Fig. 3, an operating arm 54 is attached to the shaft 52 and is adapted to pivot the last 24 in a vertical plane about the axis of the shaft. A latch 55 is slidably mounted on the operating arm 54, and it is provided with a detent 56 which is adapted to engage notches 57 in a fixed arc 58, which is secured to the frame 59 of the jig. Several of the notches 57 are provided for the purpose of holding the last 24 in any one of several elevated positions, which may be selected by operators of different heights. The latch 55 is spring-pressed by a spring 59 held under compression between the latch guide 60 and a pin 61 secured to the latch 55. A handle 62 is attached to the operating arm 54, and a handle 63 is attached to the latch 55. Both handles are placed adjacent to each other so that the latch detent 56 may be withdrawn from the notches 57 by the operator's hand which grips the handle 62 to operate the arm 54.

The downward movement of the arm 54 is limited by an adjustable screw stop 64, which abuts against the stationary bed plate 65, of the jig 26. The stop 64 is threaded into a bracket 66 attached to the arm 54. The lower position of the arm 54 is adjustable to change the angularity of the plane 37 of the last 24 longitudinally, or in the heel to toe direction with respect to the plane of the mold rim 30. Such adjustment is made by the thumb nut 67 which is attached to the stem of the screw stop 64. The stop 64 is also provided with a lock nut 68 which locks it in any adjusted position.

The transverse angularity of the plane 37 of the last to the plane of the mold rim 30 is also adjustable by two set screws 69, one in each of the ears 70 on each side of the slide block 46. The overhanging last supporting arm 38 is pivotally attached to the block 46 on a stud 71 which passes through a downwardly extending projection 72 of the last supporting arm 38 and is secured in the slide block 46 below the laterally adjusting screws 69. The ends of the screws 69 operate upon the arm 38 and pivots it about the stud 71.

The mold 28 is supported on a plate 73, which is adapted to be leveled and to be moved in a horizontal plane for the purpose of leveling the mold 28 and adjusting its position in all directions in the horizontal plane in respect to the last 24. The plate 73 is leveled by three leveling screws 74 which are threaded into the plate. The ends of the screws project through the plate 73 and support it on the horizontal base plate 65. The plate 73 may be adjusted in all directions in the horizontal plane by three thumb nuts 75, which are secured to the stems of horizontally arranged screws 76 threaded into brackets 77 on the plate 73. The adjusting screws 76 are rotatably mounted in notches 78 in brackets 79, which are affixed to the base plate 65. The details of the mechanism for adjusting the plate 73 horizontally are shown in Figs. 4 and 5. The stem of each screw 76 is provided with flanges 81, which straddle the bottom of the notch in the brackets 79 on the plate 65 in order to prevent the screws 76 from moving in an axial direction. The stem 80 of the screw 76 between the flanges 81 is smaller in diameter than the length of the notch 78 so as to permit the screw to move transversely, and the flanges 81 are beveled to permit them to wobble in the notch 78, and thereby permit the plate 73 to move in any direction within its plane, in response to the individual pressure of each screw without causing the stem 80 or the flanges 81 to bind in the notch 78.

The mold 28 is usually sufficiently heavy to prevent it from being lifted when the cast latex sole 19 is moved vertically upwardly out of the mold cavity 27, but in order to prevent the mold from creeping out of position, it is desirable to secure the mold in a well 82 in a rigid frame 83, which in turn is held in a fixed position on the plate 73. The frame 83 is clamped to the plate 73 by two long bars 84 on opposite sides of the frame and by two short bars 85 placed on the opposite ends of the frame. The bars 84 and 85 are adjustably secured to the plate by means of bolts 86 having T-shaped heads 87 slidably mounted in under cut slots 88 in the plate 73. The bolts 86 extend up through the bars 84 and 85 and are affixed in place by tightening the nuts 89 thereon.

In the operation of the jig 26, its operating handle 54 is held in its raised position as shown in Fig. 2 by the engagement of the detent 56 with one of the notches 57 of the fixed sector 58. The last 24 having an upper 16 lasted thereon, as described in reference to Fig. 1, is attached to the overhanging arm 38 by clamping it thereto with the hand wheel 39. The mold supporting plate 73 is leveled by the screws 74, and when that is done the plane of the top rim 30 of the mold will be parallel with the top surface of the plate 73. The mold frame 83 is removed from the plate 73, and the jig operating arm 54 is lowered until the stop 64 carried thereby rests upon the bed plate 65. The bottom plane 35 of the last 24 as defined by the border of its convex curvature is positioned parallel with the top surface of the plate 73 by turning the thumb nut 67 on the vertically adjustable stop 64, and by turning the set screws 69 on the horizontal adjusting screws. The lasted shoe upper 16 is then raised to its elevated position.

The frame 83 and the mold 28 carried thereby is placed on the supporting plate 73 underneath the elevated position of the lasted upper 16, and the bars 84 and 85 are released from the plate 73, so that the frame 83 and the mold 23 carried thereby may be moved freely on the plate 73. A layer of material, such as cardboard, having a thickness of the outsole to be cast on the bottom of the lasted upper 16 is placed in the mold cavity as a thickness gauge for the purpose of determining the thickness of the outsole. The jig arm 54 is then lowered, and the mold 28 is adjusted on the plate 73 so that the bottom of the upper 16 is positioned in the mold cavity 27, and the mold rim 30 is evenly spaced from the bottom side edges of the upper around the entire circumference. In such position the stop 64 should be resting upon the bed plate 65, and the bottom of the upper should be slightly spaced from the sole thickness gauge. The vertically adjusting hand wheel 50 is then turned so as to bring the bottom of the shoe upper into contact with the outsole thickness gauge. The securing bars 85 are brought up against the sides and ends of the mold frame 83, and the nuts 89 are turned downwardly on the studs 86 so as to secure the mold and the frame 83 in their located position. The jig arm 54 is then elevated, and the sole thickness gauge is removed from the bottom of the mold cavity 27. The jig is now in its adjusted position to begin the casting of integral outsoles and foxings onto the bottom of the lasted upper 16.

A predetermined quantity of gelable latex is then poured into the mold cavity 27 while the jig manipulating arm is in its raised position as shown in Fig. 2. The operator then grasps the handles 62 and 63 of the arm 54 and lowers the bottom of the shoe upper 16 into the latex 29 until the downward movement of the arm 54 is stopped by the screw stop 64 which strikes against the base plate 65. When this occurs the latex should be forced up to the level of the top rim 30 of the mold cavity, and it should flow in between the rim and the shoe upper around its entire circumference, provided the proper amount of latex has been poured into the mold cavity. The latex normally gels in about three minutes, and the shoe with the cast latex sole thereon may be removed therefrom by lifting the jig arm 54 to the position shown in Fig. 2. The last 24 and shoe 15 is then removed from the jig 26 by turning the hand wheel 39. The last 24 with the shoe 15 thereon is then passed through the vulcanizer for the proper period of time to cure the rubber parts. The cure time for the compound described herein is 80 minutes.

After the removal of the last 24 having the rubber sole cast thereon, another lasted upper is affixed to the jig arm 38. Another batch of gelable latex is poured into the cavity, and the foregoing operations are repeated. It will be found however that there are slight variations in the size of the bottoms of the lasted uppers, and that although the same quantity of latex is poured into the mold cavity in every instance, the latex will not rise to the same level when the bottom of the shoe is lowered thereinto, and the rim of the mold will not be evenly spaced from the upper all around its circumference. Therefore in order to bring the level of the latex up to the level of the top of the mold cavity in every instance it is sometimes necessary to manipulate the hand wheel 50 to raise or lower the last 24, and it may also be necessary to manipulate the horizontal adjusting thumb nuts 75 to move the mold laterally on the base plate 65 to properly space the shoe upper evenly from the rim 30 of the mold cavity 27.

The flexible mold 28 may be prepared from well known liquid cold setting materials. For example, a suitable and inexpensive mold may be made from "Perma-Flex Cold Molding Compound" which is manufactured by the Perma-Flex Mold Company, 243 North Fifth Street, Columbus, Ohio. In the preparation of the mold, a model of the sole, or the sole and foxing to be cast is made. This is conveniently done by lasting an upper on the special last 24 in the conventional manner as described in Fig. 1, and then building onto the upper an outsole and foxing having the shape and decorations of the shoe parts, as cast. A box is then made similar to the frame 83, excepting the depth of the well in the box is equal to the overall height of the mold to be cast from the molding compound. The last 24 with the model thereon is placed in the jig 26, and the plane 35 of the border of the bottom curvature of the sole is leveled, or made parallel with the top surface of the leveled mold supporting plate 73 in the manner described in reference to the leveling of the lasted shoe upper 16. The hand wheel of the jig 50 is turned so as to raise the bottom of the model above the top rim of the box when it is placed on the leveling plate 73. The jig arm 54 is then raised to its upper position as shown in Fig. 2. The box is placed underneath the shoe, and the prepared molding compound is poured into the box until it rises to a level which leaves a volumetric space in the well equal to the volume of the mold cavity to be formed. Marks are made on the sides of the model at the level of the latex to be cast on the upper to form the sole, or sole foxing. The jig arm 54 is then lowered until the stop 64 strikes the base plate 65, and the hand wheel 50 is then turned down into the molding liquid in the box until the markings placed on the sides of the model come even with the surface of the liquid molding compound. The model shoe is then left in that position until the molding compound firmly sets. It is desirable to so gauge the quantity of molding compound placed in the box that it rises slightly above the top edge. The excess of the set compound is trimmed off to form a smooth straight and level top rim on the cast mold. The model is then released from the jig 26 by the hand wheel 39, and the model, mold, and box are removed together from the plate 73. The mold is then removed from the box and stripped from the model.

Substantially the preceding procedure is followed in making the last and mold shown in Fig. 9 and in casting the rubber parts on the shoe with a heel shown in Fig. 10. As shown in Fig. 9 the last 90 is provided with a convex bottom 91, which extends from the breast 92 of the heel to the toe. The border of this convex portion of the bottom lies in a plane 93, but the heel portion is provided with a flat surface 94 to receive an insert filler 95, which is placed on top of the insole 96 and affixed thereto.

The bottom of the mold cavity 97 forward of the breast of the heel is concave and conforms to the corresponding convex curvature of the last 90. The bottom of the heel portion of the cavity 97 is depressed and has a concave curvature to cast a corresponding convex curvature on the shoe heel from the gelable latex 98.

This is a continuation of application Serial No. 192,086, filed October 25, 1950 and now abandoned.

Having thus described our invention, what we claim and desire to protect by Letters Patent is:

1. A method of casting a rubber composition outsole onto the bottom of a shoe sole foundation comprising the steps of adding a gelling agent to a vulcanizable rubber latex, pouring the gelable latex into a shoe sole mold cavity, suspending the bottom of the sole foundation in the gelable latex and supporting said foundation independently of the walls of said mold cavity, allowing said latex to gel on said suspended foundation, separating said foundation with the gelled latex adhered thereto from the mold cavity, and drying and vulcanizing said gelled latex.

2. A method of casting a rubber composition outsole onto a shoe sole foundation according to claim 1 where said latex is deaerated and partially vulcanized prior to adding the gelling agent.

3. A method of casting a rubber composition outsole onto a shoe sole foundation according to claim 1 where said latex is compounded with an ultra accelerator and deaerated and partially vulcanized by allowing to stand a sufficient time prior to adding the gelling agent.

4. A method of casting a rubber composition outsole onto a shoe sole foundation according to claim 1, where said latex is compounded with an ultra accelerator and deaerated and partially vulcanized by allowing to stand a sufficient time prior to adding a gelling agent, and then the gelled latex is simultaneously dried and completely vulcanized at above 220° F.

5. A method of casting a rubber composition outsole onto a shoe sole foundation comprising the steps of adding a gelling agent to a vulcanizable rubber latex composition, pouring the gelable latex into a shoe sole mold cavity having flexible elastic side walls which overhang said cavity, suspending said sole foundation in the gelable latex and supporting said foundation independently of the walls of said cavity so that the latex is subjected to substantially atmospheric pressure, allowing said latex to gel on said suspended foundation, raising said foundation vertically from said cavity and thereby expanding said elastic side walls thereof by the pressure of the gelled latex thereon, and drying and vulcanizing said gelled latex outsole.

6. A method of casting a rubber composition outsole onto a shoe sole foundation according to claim 1, where the mold cavity is made of an elastomer and the surface of the mold cavity is coated with a solution of sodium salt of di-octyl ester of sulfo succinic acid which wets said surface and inhibits the synaeresis of the latex.

7. A method of casting a rubber composition outsole onto the bottom of a shoe sole foundation according to claim 1 where said foundation is suspended in said mold cavity to a depth to form a foxing around the shoe upper and the latex is forced up to the level of the top edge of the mold cavity.

References Cited in the file of this patent

UNITED STATES PATENTS

| | | |
|---|---|---|
| 13,073 | Winley | June 12, 1855 |
| 1,400,143 | Dial | Dec. 13, 1921 |
| 2,129,106 | Szerenyi | Sept. 6, 1938 |
| 2,580,245 | Rollman et al. | Dec. 25, 1951 |